Nov. 26, 1940.   H. H. STEWART   2,223,335
AIRCRAFT WING
Filed July 14, 1938   6 Sheets-Sheet 6

INVENTOR.
Harry H. Stewart
W. F. Meringer
ATTORNEY

Patented Nov. 26, 1940

2,223,335

UNITED STATES PATENT OFFICE 2,223,335

AIRCRAFT WING

Harry H. Stewart, Flushing, N. Y.

Application July 14, 1938, Serial No. 219,138

11 Claims. (Cl. 244—4.4)

This invention relates to aircraft wings, and more particularly to novel airfoils and mechanisms whereby a pilot may readily vary the thickness of an airfoil and change either its upper or lower camber, or both.

Variable camber airfoils, as heretofore constructed, generally have been too complicated and heavy for commercial use; and, with the many types of flaps now available, it has been contended that there is little need of a variable camber airfoil. However, consideration of the aerodynamics of this problem proves that a suitable variable camber airfoil has many advantages over airfoils having flaps.

The main object of this invention is to provide an improved airfoil which is readily variable in thickness and camber within a wide range, so that a basic thin section wing may be changed to a selected thick section wing, and vice versa, while at all times maintaining a smooth and proper camber curvature that develops the maximum desirable characteristics for any selected variation but in no way affects the inherent rigidity of the normal wing structure.

Another important object of the invention is to provide a simple and light mechanism for this purpose which may be conveniently incorporated in modern airplane wing structures, particularly in conventional metal skin wing sections.

A further object of the invention is to provide an airplane wing which is simple and economical to construct and is so designed that parts of the skin are readily removable independently of other parts, to permit access to the interior of the wing for inspection, repair or replacement of portions of the camber varying mechanism.

These and other objects and the novel features of this invention will become apparent from the following description considered with the accompanying drawings, in which.

Figures 1, 2:
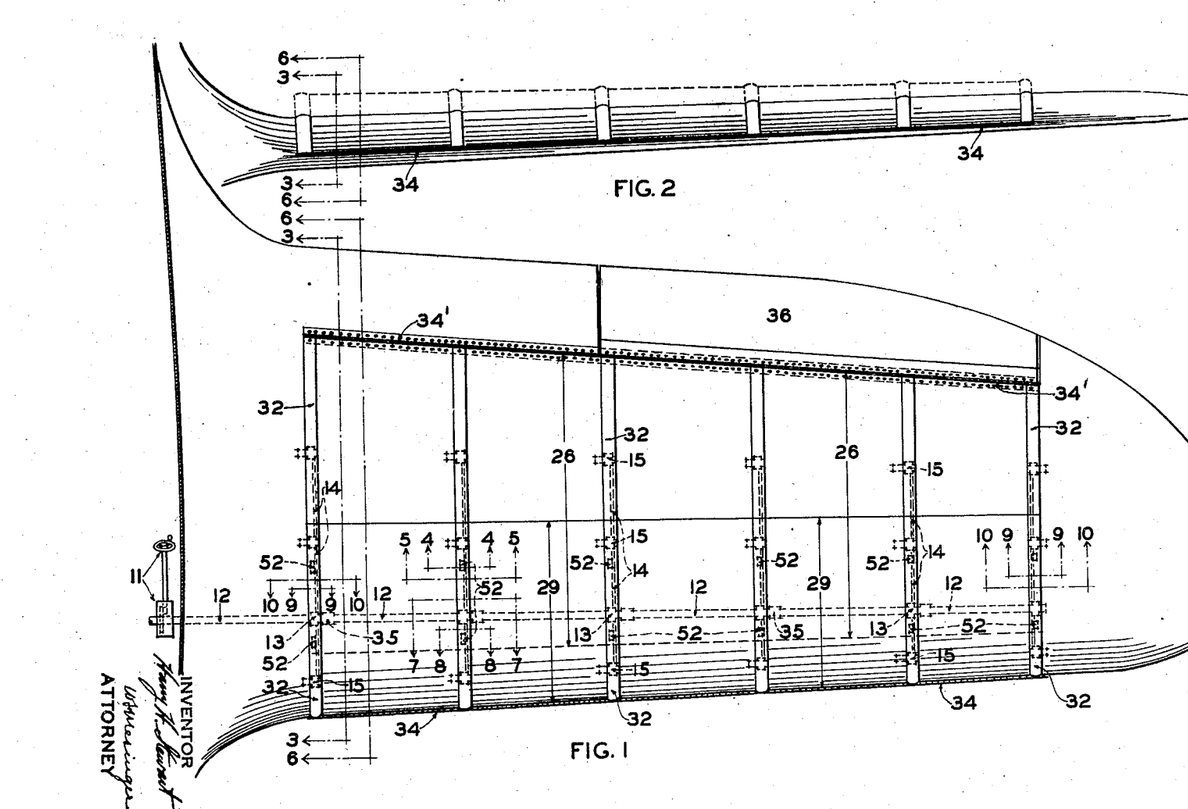
Fig. 1 is a plan view of a metal airplane wing embodying this invention, showing parts of the interior mechanism in dotted lines.
Fig. 2 is a front or leading edge elevation of the wing shown in Fig. 1, illustrating in solid outline the basic high speed wing thickness and in dotted outline the greater relative thickness obtainable for high lift characteristics.
Figure 3:
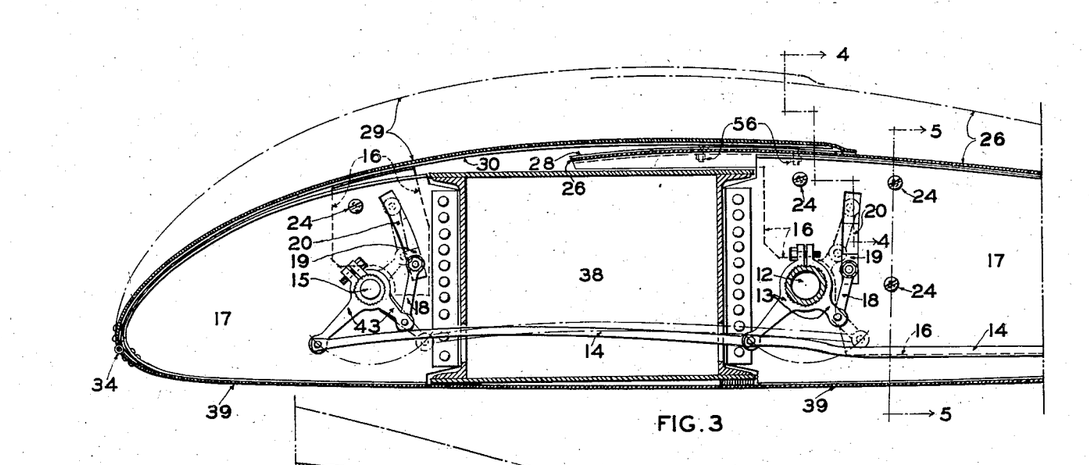
Figs. 3 and 3a when placed end to end, together illustrate on an enlarged scale, a transverse section of the wing, taken on the lines 3—3 of Figs. 1 and 2, showing the invention embodied in a two-spar cross-rib unstressed skin type of wing structure, the movable upper skin being shown in solid lines in the basic wing position and in dotted lines in an extended or auxiliary position, and a conventional flap being shown in full and dotted lines in different positions.
Figure 3A:
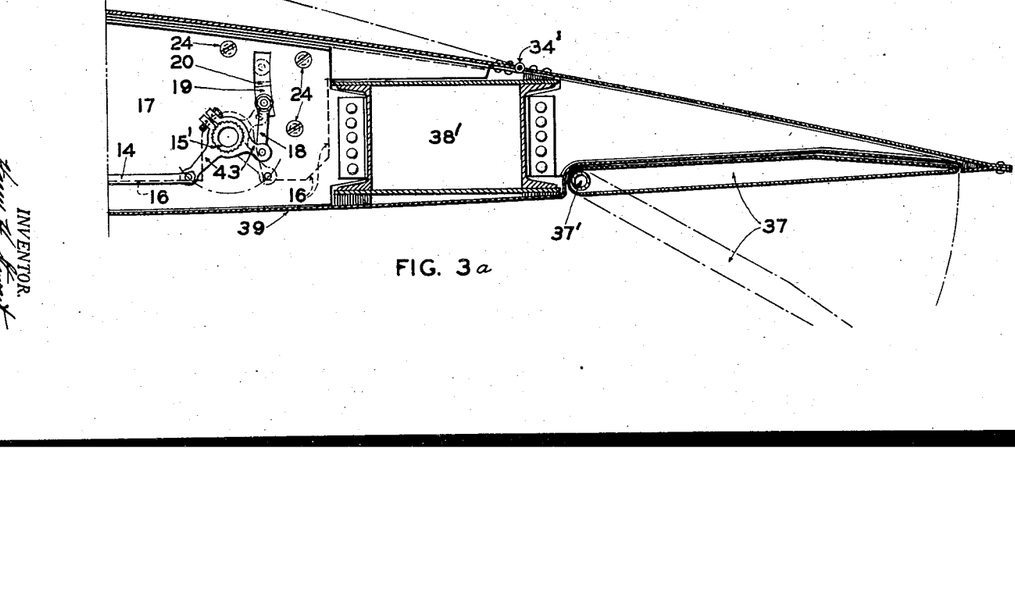
Figure 4:
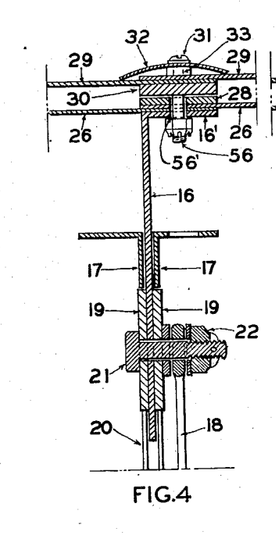
Fig. 4 is a large scale sectional view, taken on lines 4—4 of Figs. 1 and 3, showing an assembly comprising a portion of a cross-rib, the upper skin sections and associated parts.
Figure 5:
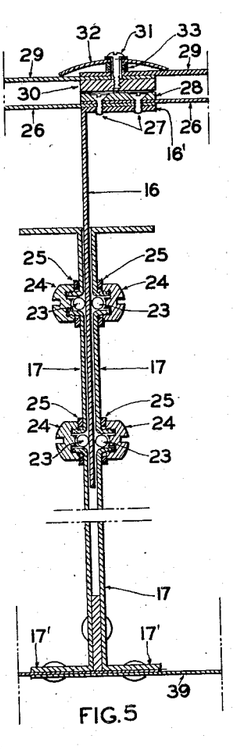
Fig. 5 is a large scale sectional view, taken on lines 5—5 of Figs. 1 and 3, showing an assembly comprising a complete rib, and both the upper and lower skins and associated parts.

Figs. 1, 2, 3, 3a, 4 and 5 illustrate the invention embodied in a two-spar cross-rib unstressed metal skin type of wing structure. The two conventional metal spars 38, 38' are nearly parallel and are located respectively near the fore and aft portions of the wing. Each metal cross-rib comprises a movable rib 16 slidable between a pair of fixed ribs 17. These cross-ribs are spaced apart and their number is determined by the span of the wing. The ribs 17 of each pair of fixed ribs are slightly spaced apart to provide slots and are formed in sections which are secured to the spars 38, 38' to provide a rigid wing frame. The lower wing sheath or skin 39 may be secured to flanges 17' on the lower ends of the ribs 17 and may consist of a plurality of metal panels continuous from the leading to the trailing edge of the wing and are of a width sufficient to bridge the space between two adjoining cross-ribs and desirably overlap on the flanges 17', as shown in Fig. 5, or they may be set in abutting relation and riveted or separately screw-fastened or otherwise firmly secured to the flanges 17' to provide a continuous lower skin. The several panels of the lower skin may thus be made removable and replaceable independently of one another so that the space between any two cross-ribs will be readily accessible by simply removing the panel closing such space.

The upper wing sheath or skin may consist of two relatively movable metal sections, the leading section being hinged at 34 lengthwise of the leading edge of the wing and overlapping the trailing section which is hinged at 34' adjacent to and lengthwise of the trailing edge of the wing. The leading upper skin section may consist of a plurality of metal panels 29, each of sufficient width to bridge the space between two adjoining cross-ribs and desirably to provide margins wide enough to overlap directly above such ribs. As shown in Figs. 4 and 5, each pair of overlapping panel margins is secured by suitable means, such as a row of screws 31, to a metal bearing and stiffening plate 30 which extends lengthwise of the joint at the inside thereof. The outside of each joint is protected and reinforced by a convex metal cover strip 32 which extends lengthwise of the joint and is secured in place by a row of the screws 31. Spacers 33 bear against the outside of a panel margin and the inside of the strip 32.

Similarly, the trailing upper skin section consists of a plurality of metal panels 26, each of sufficient width to bridge the space between two adjoining cross-ribs and to provide margins which overlap on and are secured by rows of countersunk screws 27 through stiffening plates 28 and panels 26 to flanges 16' on the several movable ribs 16. The metal bearing and stiffening plate 28 is coextensive with each flange 16' and is secured thereto and against the outside of an overlapping margin of a panel 26 by the rows of screws 27, so that each plate 30 is directly above and rides upon each plate 28, and is lubricated or equipped with anti-friction bearings to reduce the friction and wear of the overlapping portions of the skin sections, when the skin sections are moved relatively to one another away from and toward the spars 38, 38' and the ribs 17 to increase or decrease the camber of the upper sheath of the wing.

Figure 6:
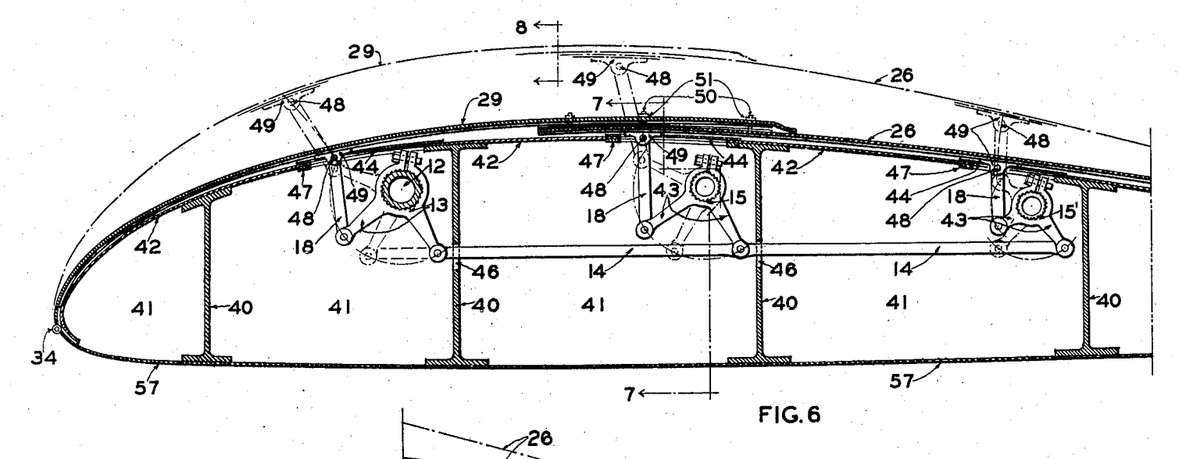
Figs. 6 and 6a when placed end to end, together illustrate on an enlarged scale, a transverse section of a wing, taken on lines corresponding to 6—6 of Figs. 1 and 2, showing the invention embodied in a multi (extruded section) spar and stressed skin type of wing structure.
Figure 6A:
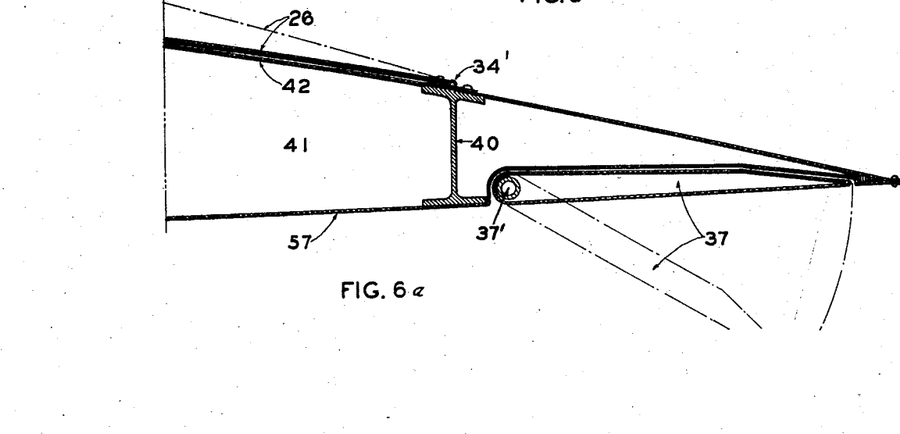

It will be understood that, in order to attain a greater continuity of the upper skin surface, the adjoining panels 29 may be arranged in abutting instead of overlapping relation and either screw-fastened, riveted or welded in pairs to the plates 30 above the leading movable ribs 16; and adjoining panels 26 may be arranged in abutting relation and similarly secured to flanges 16' and plates 38. Here, the cover strips 32 may be omitted if desired. However, the adjoining panels in all instances preferably are overlapped and screw-fastened in place as shown. In Figs 3, 3a if the movable sections of the upper wing are riveted to the movable cross-ribs, then the lower skin panels are screw-fastened to the lower flanges of the fixed ribs. In Figs. 6, 6a, the stressed skin is riveted throughout to the frame of the wing, and the panels of the movable sections are then screw-fastened to associated parts.

To maintain the upper skin sections in fixed relation to one another, and to guide them with suitable clearance while they are moving relatively to one another, each plate 30 has two or more integral threaded studs 56 spaced clear of screws 27 which extend inwardly through an equal number of registering slots 56' in the opposed plates 28, the flanges on the movable ribs 16, and the margins of the panels 26 between such ribs and flanges, as best shown in Fig. 4. These studs 56 carry nuts at their inner ends which are safety wired to the studs at a position to provide proper clearance.

Figure 7:
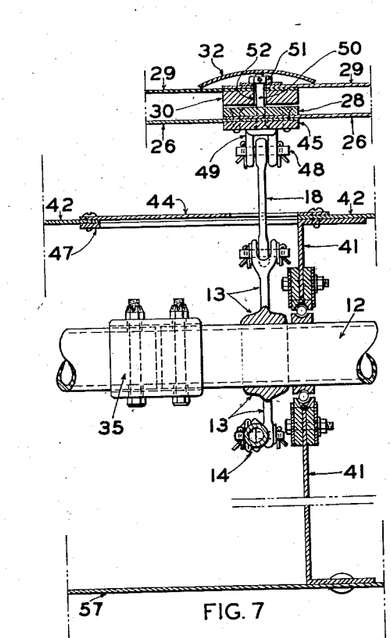
Fig. 7 is a large scale sectional view taken on line 7—7 of Figs. 1 and 6, and showing a part of a torque tube, a coupling thereof, a crank thereon, and a push rod connected to the crank, all constituting parts of mechanism for varying the camber of the upper skin of the wing.
Figure 8:
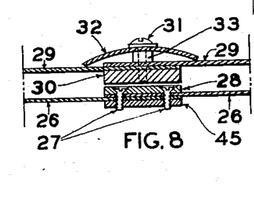
Fig. 8 is an enlarged sectional view taken on lines 8—8 of Figs. 1 and 6, showing the construction of overlapping portions of the upper skin sections.

As best shown in Figs. 3, 3a and 7, the mechanism for positively moving the skin sections in unison outwardly from or inwardly to the basic wing position, to vary the camber of the wing, may comprise a main transversely extending hollow metal torque tube 12 journalled in the ribs 17 between the spars 38, 38' and near the center of the wing, and a suitable number of short auxiliary hollow metal torque tubes 15, 15' individually journalled in the ribs 17 parallel to the main tube 12, in front of the main spar 38 and between the tube 12 and the rear spar 38'. The torque tube 12 is formed in sections approximately equal in length to the distance between two adjoining cross ribs, and these sections are connected together by couplings 35, as shown in Fig. 7. A double-arm master crank 13 is rigidly mounted on the torque tube 12 adjacent each rib 17, and an auxiliary double-arm crank 43 is similarly mounted on each of the auxiliary tubes 15 and 15'. Each master crank 13 and the auxiliary cranks in line therewith adjacent each cross rib are connected together in a group by tubular metal drag links 14, the ends of which are pivoted to appropriate arms of these cranks, so that the auxiliary tubes 15, 15' will rotate simultaneously with the main torque tube 12. The master crank and auxiliary cranks are each provided with two arms, one arm of each crank being connected by push rods 18 to parts of the movable ribs 16. As best shown in Figs 3, 3a and 4, the push rods 18 are severally pivotally connected at one end to the above-mentioned arms and at their other ends to bolts 21 which extend through the adjacent part of a rib 16 and through plates 19 bearing against opposite sides of the rib 16. A nut 22 which is cotter-pinned to a threaded end of each bolt 21 is set to provide sliding clearance sufficient for pivoting of the rods 18 on the bolts 21. The fixed rib members 17 are appropriately slotted, as at 20, to receive the plates 19 and thereby guide the assemblies at the upper ends of the push rods 18. As shown in Fig. 5, in order to eliminate excessive sliding friction between the sliding and fixed ribs 16 and 17, the fixed ribs 17 may be punched out to receive ball bearings 23, and threaded caps 24 may be lock-washered, as at 25, or safety-wired in place, to provide close clearances for the cooperating ball bearings and ribs 16, thus providing free sliding action without loss of rigidity. As shown, the torque tube 12 and auxiliary tubes, 15 and 15' and the mechanism associated therewith are located within the wing. The main tube 12 is preferably mounted in the region directly below the overlapping portions of the upper skin sections, and the push rods operated by it and the rear auxiliary tube 12" are connected to movable ribs 16 which are secured to the trailing section of the sheath comprising the panels 26. The front auxiliary tube 15 is operated by push rods connected to movable ribs 16 which are secured to the leading section of the skin comprising the panels 29.

From the foregoing it will be evident that angular rotation of the main torque and auxiliary tubes, carrying suitable cranks having arms of appropriate lengths, will impart the desired outward or inward movement to the movable ribs 16, thereby causing the overlapping skin sections to move away from or toward a basic position, the necessary increase in perimeter of the skin being provided for through the sliding overlap of the forward skin section over the rear section, i. e., plates 30 on plates 28. The simplicity of the construction, from the standpoint of manufacture, assembly and inspection or repair, will be apparent. The basic problems of performance limits having been determined for a specific application, complete or partial disassembly for the purposes of inspection, adjustment or repair can readily be made. Single panels of either the upper or lower skin can be removed at a time, if desired, and all of the mechanism behind that panel will be accessible. The maximum rigidity of the wing is maintained at all times, since the camber-varying mechanism does not change the relative positions of the spars and the cross-ribs. The construction does not in any way conflict with the conventional aileron 36 that is used for lateral balance, and the ribs may be drilled or cut out for the necessary control connections. Also, a split type flap 37 pivoted at 37' may be, and desirably is, operated in conjunction with the variable camber construction herein disclosed, whereby these two devices will cooperate to produce further changes in the characteristics of the basic wing, and either of them may be operated independently of the other. Such changes are not equal or similar at all attitudes, and since both devices may readily be used together each as an adjunct to the other, the advantages of the conjoint action of both may be obtained for a given situation while by independent manipulation of either one any inherent disadvantages thereof for a particular situation may be minimized.

The principles of the invention disclosed in Figs. 1, 2, 3, and 3a may be embodied in other types of airplane wing structures. For example, Figs. 6 and 6a together illustrate a multi-spar stressed skin wing in which a plurality of spars 40 approximately I-shaped in cross section extend longitudinally of the wing. Transverse diaphragms 41 are secured to the spars 40 at spaced intervals, thus providing a rigid frame to which the stressed skin is secured, such skin consisting of a lower stressed skin 57 and an upper stressed skin 42, both of which are permanently secured to the flanges of the spars 40 and diaphragms 41. In addition to the stressed skin, adjustable sheath or skin sections may be arranged to cover either the lower or upper portions of the stressed skin, or both. As shown, two relatively movable upper sheath sections 26 and 29 are provided. The sections 26 and 29 are substantially identical in construction to those already disclosed. Furthermore the mechanism for adjusting the sections 26 and 29 relatively to one another to vary the upper camber of the wing is generally the same in principle as hereinbefore disclosed, except that the main torque tube 12 is shown nearest the leading edge of the wing, the auxiliary tubes 15 and 15' being located behind the main torque tube 12, and the cranks on the several tubes being connected by drag links which pass freely through suitable openings in the spars 40.

Since the upper stressed skin 42 is fixed to the spars 40 and diaphragms 41, access to the several tubes and their associated parts may be provided by cutting openings of a suitable size through the skin 42 directly opposite the double-armed cranks on the several torque tubes. These openings may be as wide as the distance between two successive cross-ribs, and are normally substantially closed by apertured panels 44 secured over the openings in the skin 42. Each panel 44 has an aperture therethrough large enough to permit the free movement of a push rod 18 when raising and lowering the movable skin section to which it is secured. As shown in Figs. 6 and 7, the push rods 18 in this construction may be pivoted, as at 48, to a fitting 49 which has two integral studs 50 extending upward through registering holes in a reinforcing plate 45, the overlapping or abutting margins of adjoining panels 26 and the bearing plate 28. The studs 50 project farther upward through a slot 52 in the reinforcing and bearing plate 30, where each stud is drawn tight by a nut 51 to provide proper clearance allowing for easy sliding movement of the skin sections relatively to one another. Otherwise, the construction and operation of this variable camber wing is substantially the same as the one shown in Figs. 3 and 3a.

Suitable mechanism is provided whereby the pilot or operator may easily turn the main torque tube 12 about its axis the proper amount to vary the camber as desired, since the several torque tubes 12, 15 and 15' desirably are rotatably mounted in antifriction bearings supported in the fixed cross-ribs or diaphragms, as shown in Fig. 7. Such mechanism is preferably located in the operator's compartment, is generally indicated at 11 in Fig. 1, and may consist of either: (1) a hand wheel operating a worm and sector gear, for hand operation; (2) a lever and holding ratchet, for direct hand or foot operation; (3) a valve-controlled vacuum or pressure operated piston and cylinder connected either to the intake or exhaust manifolds, for mechanical operation; or (4) a switch controlled electrical apparatus operated from a storage battery, for electrical and mechanical operation.

Figure 11:
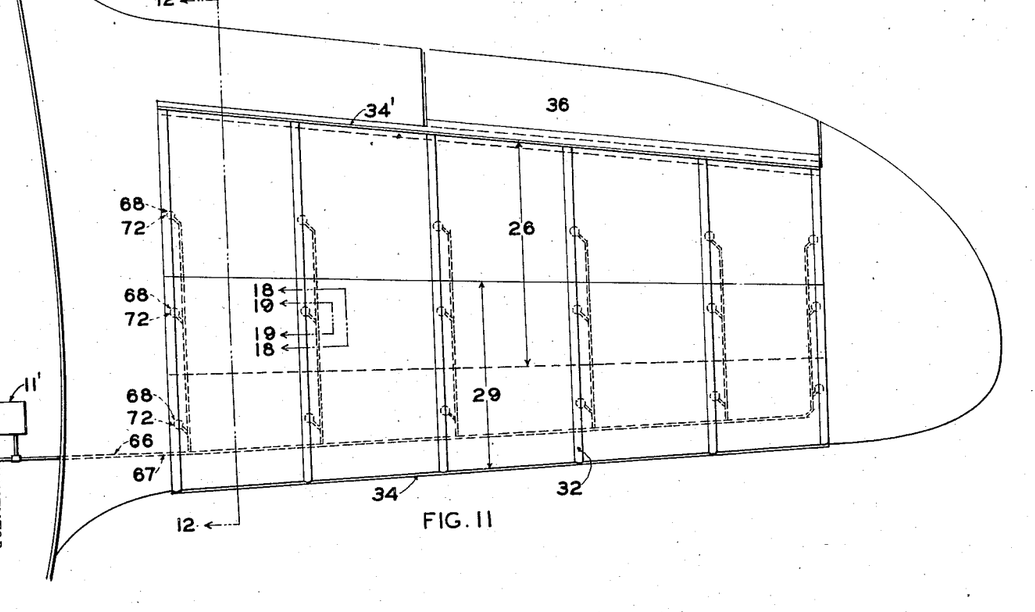
Figs. 11 and 12 are respectively a plan view and a transverse sectional view of another wing embodying this invention and provided with fluid-actuated mechanism for varying the camber of an airplane wing.
Figure 12:
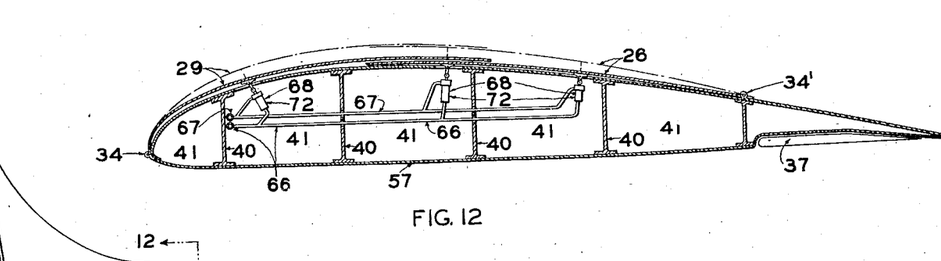
Figures 13, 14, 15, 16, 17, 18, 19:
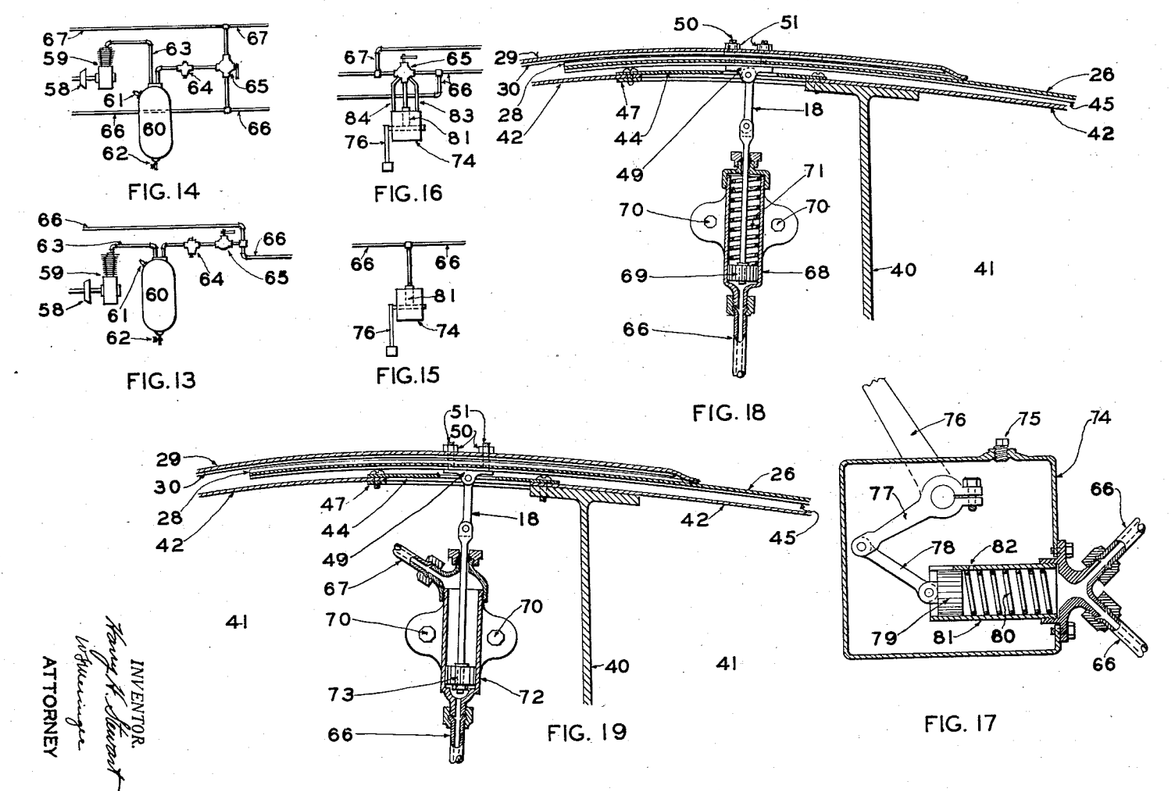
Figs. 13, 14, 15 and 16 are views illustrating fluid supply and control mechanisms which may be employed to actuate suitable devices for varying the camber of a wing.
Fig. 17 is an enlarged sectional view of a liquid reservoir and associated mechanism for actuating devices used to vary the camber of a wing.
Figs. 18 and 19 are sectional views respectively illustrating a single-acting and a double-acting expansion cylinder and an upper wing skin to which they are connected.

Fluid-operated mechanism may be employed in place of the torque tubes and associated devices, to raise and lower the relatively movable wing sections, and to maintain the latter in any one of their adjusted positions. Examples of the embodiment of such fluid-operated mechanism in a wing structure similar to the one shown in Figs. 6 and 6a is illustrated in Figs. 11 and 12, and details of such fluid-operated mechanisms are disclosed in Figs. 13 to 19, inclusive. As illustrated in Fig. 18 for example, the piston 69 of a single-acting cylinder 68 may be pivotally connected to the push rod 18; and fluid, such as air under pressure, may be admitted through the pipe 66 to raise the movable wing section to which the push rod is connected, and thereby increase the camber of the wing. Upon release of the air pressure in the cylinder 68, a spring 70 operates to force the piston and the push rod 18 connected thereto back to their initial position, thereby decreasing the camber of the wing. The cylinder 68 may be secured to a diaphragm 41 by bolts 70. The control of the admission and release of air pressure to the tube 66 may be controlled from the operator's compartment by suitable mechanism designated generally as 11' in Fig. 11. As shown in Fig. 13, this mechanism may consist of an air compressor 59 which is connected to the airplane engine through a clutch 58 to compress air and deliver the same through a pipe 63 to a reservoir 60 which has a blow-off valve 61 and a drip cock 62. In order to prevent moisture precipitation in the tubing 66, a pressure-reducing valve 64 may be used so that the pressure in the reservoir 60 may be greater than in the tubing 66 that connects the reservoir to the cylinder 68. Operation of a control valve 65 to one position admits compressed air to the cylinder 68, to increase the camber of the wing; and similarly when the valve 65 is shut off the air in the tubing 66 and cylinder 68 is permitted to escape through a bleed in the valve-operating casing 65, whereupon the spring 71 returns the piston 69 to its initial position and the wing is restored to its basic high speed camber curvature.

Figs. 12 and 14 illustrate fluid-actuated operating mechanism embodying double-acting cylinders 72 to the opposite ends of which are connected separate air supply tubings 66 and 67. In this arrangement, the operating valve 65 is constructed to feed compressed air from the reservoir 60 to either one of the tubes 66 or 67. If compressed air is supplied through operating valve 65 into line 66, and line 67 is opened to the atmosphere through operating valve casing bleed, then piston 73 in cylinder 72, Fig. 19, will rise and also raise the wing skin through push rod 18 as hereinbefore described. Similarly, if line 66 is bled to the atmosphere, and compressed air is fed into line 67, the piston will be forced downward, thus restoring the wing skin to its basic position.

Figs. 15 and 17 illustrate mechanism for supplying hydraulic pressure to tubes 66 which are connected to single-acting cylinders similar to the cylinder 68 shown in Fig. 18. In its simplest form this arrangement may consist of a liquid reservoir 74, filled through a plug 75, and a pivoted operating lever or pedal 76 having an arm 77 connected by a link 78 to a piston 79 operating in a cylinder 81 having a liquid inlet 82 communicating with the reservoir 74. The lever 76 is accessible to the pilot and when it is depressed, the piston 79 is moved forward in the cylinder 81 and forces the hydraulic liquid through the tubing 66, thus causing the piston 69 in each actuating cylinder 68 to raise, whereupon the push rods 18 connected to the pistons 69 move the upper skin sections 26 and 29 outwardly. When the lever 76 is released, the coil spring 60 in the cylinder 81 forces the piston 79 to its normal position, whereupon the pressure in the tubing 66 is released and the springs 71 in the actuating cylinder 68 restore the pistons 69 to their initial position and the wing sections to their normal or basic positions.

Fig. 16 illustrates a hydraulic control mechanism which may be employed to operate double-acting cylinders similar to the one shown in Fig. 19. Here the reservoir 74, the lever 76, and the associated parts are similar to the one disclosed in detail in Fig. 17, except that two liquid pressure return lines 83 and 84 are connected to the reservoir 74 and to a control valve 65 which is arranged to admit hydraulic pressure to either the tubing 66 or the tubing 67. This arrangement is similar in general to the arrangement shown in Fig. 14, except that a closed liquid circulating system is employed.

Figure 9:
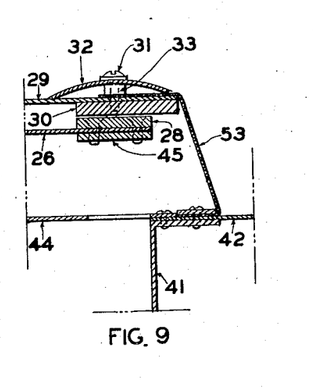
Figs. 9 and 10 are sectional views, taken respectively on lines 9—9 and 10—10 of Fig. 1, showing alternative closure constructions for the ends of the variable camber wing.
Figure 10:
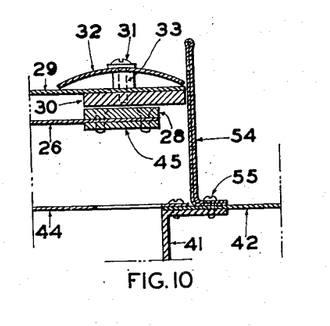

Suitable means are provided to close the ends of the wing when the skin is positioned to increase the wing camber. As shown in Fig. 9, sheets of suitable flexible waterproof material 53 may be secured along one margin to a flange of each fixed end rib 41 and along its other margin to the movable skin section 29 and similarly to the movable skin section 26, the sheets 53 being sufficiently long and wide to completely close the opposite ends of the wing when the latter is fully expanded. Fig. 10 illustrates an alternative end closure which tends to reduce the end loss effect common to all airfoil forms. Here rigid vertical curved metal fins 54 are secured, as by rows of screws 55, to the flange of each end rib 41, in position to completely close the ends of the wing in any expanded position of the movable skin sections.

It will be understood that numerous changes may be made in the details of construction as herein disclosed, and certain features of the invention may be used without others. For example, either the lower or the upper skin, or both, may be of a variable camber; either or both upper and lower skins may consist of a plurality of panels; or the overlapping variable camber skin sections may be of continuous non-panelled construction while providing a lower fixed or non-variable skin section made up of panels as disclosed to permit access to any space between two cross-ribs without disturbing other panels or the relatively adjustable continuous wing sections.

I claim:

1. A variable camber aircraft wing comprising fixed longitudinal spars and fixed cross-ribs secured thereto forming a completely self-sustaining wing structure; upper and lower skin surfaces at least one of said surfaces being a stressed skin and one of said surfaces comprising flexible relatively movable leading and trailing sections, the leading section overlapping the trailing section; mechanism disposed within the wing for adjusting said sections relatively to each other and varying the sectional thickness of the wing through a predetermined range, said mechanism including devices positively secured to each of said movable sections at a plurality of spaced points adjacent each cross-rib and arranged to simultaneously and uniformly vary the camber of both sections to form a new camber curvature particularly suited to said changed wing thickness, and means operatively connected to each of said devices constructed and arranged to maintain each of said devices in adjusted positions at any intermediate point of said predetermined range; and supporting means arranged solely for supporting said mechanism by said wing structure, said mechanism being otherwise independent of said wing structure whereby the structural rigidity of the wing remains unaffected.

2. A variable camber aircraft wing as claimed in claim 1, in which said sections are hinged, respectively, adjacent the leading and trailing edges of the wing, and said overlapping portions are relatively slideably connected together and provided with reinforcements having a sufficient degree of flexibility for the formation of said new camber curvature.

3. A variable camber aircraft wing as claimed in claim 1, in which said mechanism comprises a plurality of fluid actuated devices severally operatively connected to said sections and said wing structure.

4. A variable camber aircraft wing as claimed in claim 1, in which each of said sections has a plurality of continuous reinforcing plates secured thereto, the plates on one section being opposed to and cooperating with the plates on the other of said sections.

5. A variable camber aircraft wing comprising a plurality of pairs of fixed cross-ribs, the several pairs of said cross-ribs being spaced apart and the cross-ribs of each pair being closely spaced apart and joined along their lower edges to form narrow transverse parallel-walled slots; a plurality of movable cross-ribs, said movable cross-ribs severally having longitudinal web portions each depending into the slot between a pair of said fixed cross-ribs, said movable ribs being vertically slidable in said slots and laterally supported by said fixed ribs; a sheath or skin comprising relatively movable leading and trailing sections secured to said movable cross-ribs, the leading section overlapping the trailing section; mechanism within said wing and connected to said movable cross-ribs, for adjusting said sections of the sheath or skin; and means for actuating said mechanism.

6. A variable camber aircraft wing comprising a plurality of pairs of fixed cross-ribs, the several pairs of said cross-ribs being spaced apart and the cross-ribs of each pair being spaced to form transverse parallel-walled slots; a plurality of movable cross-ribs, said movable cross-ribs severally having web portions disposed in said slots for vertical movement relative to each respective pair of fixed cross-ribs; antifriction elements disposed between said fixed cross-ribs and said movable cross-ribs; a sheath or skin comprising relatively movable leading and trailing sections secured to said movable cross-ribs, the leading section overlapping the trailing section; and mechanism within said wing and operatively connected to said movable cross-ribs for adjusting the position of said sections of the sheath or skin.

7. A variable camber aircraft wing comprising a frame; a sheath or skin including relatively movable co-operating sections having overlapping portions between the leading and trailing edges of the wing; and mechanism within the wing for adjusting said sections to vary the sectional thickness of the wing through a predetermined range; said mechanism including a main rotatable torque tube and a plurality of auxiliary rotatable tubes axially parallel to said main tube; a plurality of bell cranks secured to said main torque tubes; corresponding auxiliary bell cranks mounted on said auxiliary tubes; link means connecting the cranks on said main tube to the cranks on said auxiliary tubes whereby said cranks are caused to rotate in unison; means connecting arms of said cranks to said wing sections, the relative lengths of the several crank arms being proportioned such that the rotation of said auxiliary bell cranks is in a predetermined ratio to the rotation of the main tube and such that the movement of said sections is proportioned to provide the desired curvature of said wing sections.

8. A variable camber aircraft wing comprising a frame including a plurality of cross-ribs each comprising a pair of fixed, rigid and outwardly flanged members and a movable member having a portion disposed between said pair of fixed members; anti-friction bearing means secured to said fixed members for providing free vertical movement of said movable member between said fixed members and for supporting said movable member against lateral displacement when in any position of the range of movement; a sheath or skin including relatively movable co-operating sections having overlapping portions between the leading and trailing edges of the wings, said movable rib members being secured to said movable sections; and mechanism within the wing operatively connected to said movable members for varying the sectional thickness of the wing.

9. A variable camber aircraft wing comprising a frame including a plurality of spars, a sheath or skin including relatively movable co-operating sections having overlapping portions between the leading and trailing edges of the wing; and mechanism within the wing for adjusting said sections to vary the sectional thickness of the wing through a predetermined range, said mechanism comprising positively actuated devices located between spars, between the leading edge and a spar, and between the trailing edge and a spar, said devices being interconnected by means extending through said spars.

10. A variable camber aircraft wing comprising a frame; a sheath or skin comprising a stressed skin secured to said frame, and relatively movable co-operating cover sections having overlapping portions between the leading and trailing edges of said wing, said sections being disposed outside of said stressed skin and normally substantially conforming to and bearing against a portion of said stressed skin; and mechanism within said wing for adjusting said cover sections to vary the sectional thickness of the wing.

11. A variable camber aircraft wing which comprises a frame; a sheath or skin comprising a stressed skin secured to said frame, and relatively movable co-operating cover sections disposed outside of said stressed skin and having overlapping portions between the leading and trailing edges of said wing; mechanism within said wing for adjusting said cover sections to vary the sectional thickness of the wing, said mechanism including a plurality of positive actuating devices having movable portions extending through openings in said stressed skin and secured to said sections; and reinforcements secured to said stressed skin about said openings whereby the strength of said skin is maintained.

HARRY H. STEWART.